United States Patent
Takahashi

(10) Patent No.: US 8,339,450 B2
(45) Date of Patent: Dec. 25, 2012

(54) DEFECT REVIEW APPARATUS AND METHOD FOR WAFER

(75) Inventor: Naohiro Takahashi, Tokyo (JP)

(73) Assignee: Fujitsu Semiconductor Limited, Yokohama (JP)

( * ) Notice: Subject to any disclaimer, the term of this patent is extended or adjusted under 35 U.S.C. 154(b) by 646 days.

(21) Appl. No.: 12/614,905

(22) Filed: Nov. 9, 2009

(65) Prior Publication Data

US 2010/0128119 A1    May 27, 2010

(30) Foreign Application Priority Data

Nov. 27, 2008    (JP) .................................. 2008-302216

(51) Int. Cl.
*H04N 7/18* (2006.01)
(52) U.S. Cl. ........................................ 348/126; 348/129
(58) Field of Classification Search .................. 348/125, 348/126, 129
See application file for complete search history.

(56) References Cited

U.S. PATENT DOCUMENTS

| | | | |
|---|---|---|---|
| 6,185,511 B1 * | 2/2001 | Steffan et al. ................... 702/81 |
| 6,483,938 B1 * | 11/2002 | Hennessey et al. ........... 382/149 |
| 6,498,867 B1 * | 12/2002 | Potucek et al. ................ 382/274 |
| 6,539,106 B1 * | 3/2003 | Gallarda et al. .............. 382/149 |
| 6,553,323 B1 * | 4/2003 | Obara et al. ..................... 702/35 |
| 6,640,000 B1 * | 10/2003 | Fey et al. ...................... 382/128 |
| 6,888,959 B2 | 5/2005 | Hamamatsu et al. |
| 7,626,163 B2 * | 12/2009 | Honda .......................... 250/306 |
| 7,968,859 B2 * | 6/2011 | Young et al. ................ 250/559.4 |
| 2004/0022429 A1 * | 2/2004 | Suzuki et al. ................. 382/145 |
| 2004/0146295 A1 * | 7/2004 | Furman et al. ..................... 398/9 |
| 2004/0206891 A1 * | 10/2004 | Ma et al. ....................... 250/225 |
| 2004/0243320 A1 * | 12/2004 | Chang et al. .................... 702/30 |
| 2005/0004774 A1 * | 1/2005 | Volk et al. ..................... 702/108 |
| 2005/0282175 A1 * | 12/2005 | Taylor et al. ...................... 435/6 |
| 2006/0069460 A1 * | 3/2006 | Smith et al. ................... 700/110 |
| 2006/0078188 A1 * | 4/2006 | Kurihara et al. .............. 382/149 |

FOREIGN PATENT DOCUMENTS

JP     2001-250852 A     9/2001

* cited by examiner

*Primary Examiner* — Patrice Winder
(74) *Attorney, Agent, or Firm* — Westerman, Hattori, Daniels & Adrian, LLP

(57) ABSTRACT

A defect review apparatus includes a storage device which stores data about a defect of an inspection target object; a first imaging device which captures an image located in a position on a surface of the inspection target object, the position being specified by information regarding the position of the inspection target object which has been input; and a control device which controls the first imaging device. The storage device stores: first defect detection data including a defect number as which the defect of the inspection target object detected by a first defect detection process is labeled, and information regarding the position of the defect; and second defect data including a defect number as which the defect of the inspection target object detected by a second defect detection process is labeled, and information regarding its position.

18 Claims, 11 Drawing Sheets

| DEFECT | DEFECT POSITION |
|---|---|
| DA1 | (x1, y1) |
| DA2 | (x2, y2) |
| DA3 | (x3, y3) |
| DA4 | (x4, y4) |
| DA5 | (x5, y5) |
| DA6 | (x6, y6) |
| DA7 | (x7, y7) |
| DA8 | (x8, y8) |

| DEFECT | DEFECT POSITION |
|---|---|
| DB1 | (x1, y1) |
| DB2 | (x9, y9) |
| DB3 | (x3, y3) |
| DB4 | (x5, y5) |
| DB5 | (x10, y10) |
| DB6 | (x6, y6) |
| DB7 | (x11, y11) |
| DB8 | (x12, y12) |

| DEFECT | DEFECT POSITION |
|---|---|
| DC1 | (x1, y1) |
| DC2 | (x9, y9) |
| DC3 | (x3, y3) |
| DC4 | (x4, y4) |
| DC5 | (x10, y10) |
| DC6 | (x6, y6) |
| DC7 | (x11, y11) |
| DC8 | (x8, y8) |

| DEFECT DETECTION DATA 42A | DEFECT DETECTION DATA 42B | DEFECT DETECTION DATA 42C | DEFECT POSITION |
|---|---|---|---|
| DEFECT | DEFECT | DEFECT |  |
| DA1 | DB1 | DC1 | (x1, y1) |
| DA2 | – | – | (x2, y2) |
| DA3 | DB3 | DC3 | (x3, y3) |
| DA4 | – | DC4 | (x4, y4) |
| DA5 | DB4 | – | (x5, y5) |
| DA6 | DB6 | DC6 | (x6, y6) |
| DA7 | – | – | (x7, y7) |
| DA8 | – | DC8 | (x8, y8) |
| – | DB2 | DC2 | (x9, y9) |
| – | DB5 | DC5 | (x10, y10) |
| – | DB7 | DC7 | (x11, y11) |
| – | DB8 | – | (x12, y12) |

| DEFECT | DEFECT POSITION | DEFECT TYPE | SEM IMAGE | OPTICAL IMAGE |
|---|---|---|---|---|
| DA1 | (x1, y1) | | | |
| DA2 | (x2, y2) | | | |
| DA3 | (x3, y3) | | | |
| DA4 | (x4, y4) | | | |
| DA5 | (x5, y5) | | | |
| DA6 | (x6, y6) | | | |
| DA7 | (x7, y7) | | | |
| DA8 | (x8, y8) | | | |

| DEFECT | DEFECT POSITION | DEFECT TYPE | SEM IMAGE | OPTICAL IMAGE |
|---|---|---|---|---|
| DB1 | (x1, y1) | | | |
| DB2 | (x9, y9) | | | |
| DB3 | (x3, y3) | | | |
| DB4 | (x5, y5) | | | |
| DB5 | (x10, y10) | | | |
| DB6 | (x6, y6) | | | |
| DB7 | (x11, y11) | | | |
| DB8 | (x12, y12) | | | |

| DEFECT | DEFECT POSITION | DEFECT TYPE | SEM IMAGE | OPTICAL IMAGE |
|---|---|---|---|---|
| DC1 | (x1, y1) | | | |
| DC2 | (x9, y9) | | | |
| DC3 | (x3, y3) | | | |
| DC4 | (x4, y4) | | | |
| DC5 | (x10, y10) | | | |
| DC6 | (x6, y6) | | | |
| DC7 | (x11, y11) | | | |
| DC8 | (x8, y8) | | | |

DEFECT REVIEW APPARATUS AND METHOD FOR WAFER

CROSS-REFERENCE TO RELATED APPLICATIONS

This application is based upon and claims the benefit of priority of the prior Japanese Patent Application No. 2008-302216, filed on Nov. 27, 2008 the entire contents of which are incorporated herein by reference.

FIELD

The disclosures relate to an apparatus and a method for reviewing a defect based on two kinds of results of defect detection conducted under different detecting conditions.

BACKGROUND

Defects of a semiconductor wafer are detected by a detecting device using an oblique illumination optical system, a detecting device using an epi-illumination inspecting device, SEM (scanning electron microscope) appearance inspecting device, or the like. A process is performed to determine whether or not certain inspection data acquired by these detecting devices are identical. Such a process of determining identity greatly reduces the number of objects to be inspected.

Using a dark-field, bright-field, or similar defect detecting method, the position of a defect is specified and an SEM image of the area where a defect is detected is acquired, thereby reducing the total area of regions to be observed by the SEM. The method in which a defect detected by a defect detector is observed (and analyzed) using the SEM is called "A SEM review."

Defect detection using various methods yields a quantity of defect detection data about each semiconductor wafer. An SEM review of the defect detection data makes it possible to categorize the defects thus detected according to defect type, such as, for example, lower layer pattern failure, an STI scratch, an inter-layer insulation film scratch, the presence of foreign matter, tungsten residue, etc.

Therefore, there is great demand for technology that can perform an SEM review more efficiently in a shorter time.

SUMMARY

The embodiments relate to a defect review apparatus includes a storage device which stores data about a defect of an inspection target object; a first imaging device which captures an image located in a position on a surface of the inspection target object, the position being specified by information regarding the position of the inspection target object which has been input; and a control device which controls the first imaging device.

The storage device stores: first defect detection data including a defect number labeling the defect of the inspection target object detected by a first defect detection process, and information regarding the position of the defect; and second defect data including a defect number labeling the defect of the inspection target object detected by a second defect detection process, and information regarding its position.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIGS. 7A to 7C are tables illustrating examples of defect detection data;

FIG. 7D is a table illustrating examples of combined data.

FIGS. 9A to 9C are tables illustrating examples of defect detection data stored in the defect detection data storage sections.

DESCRIPTION OF EMBODIMENTS

Figure 1:
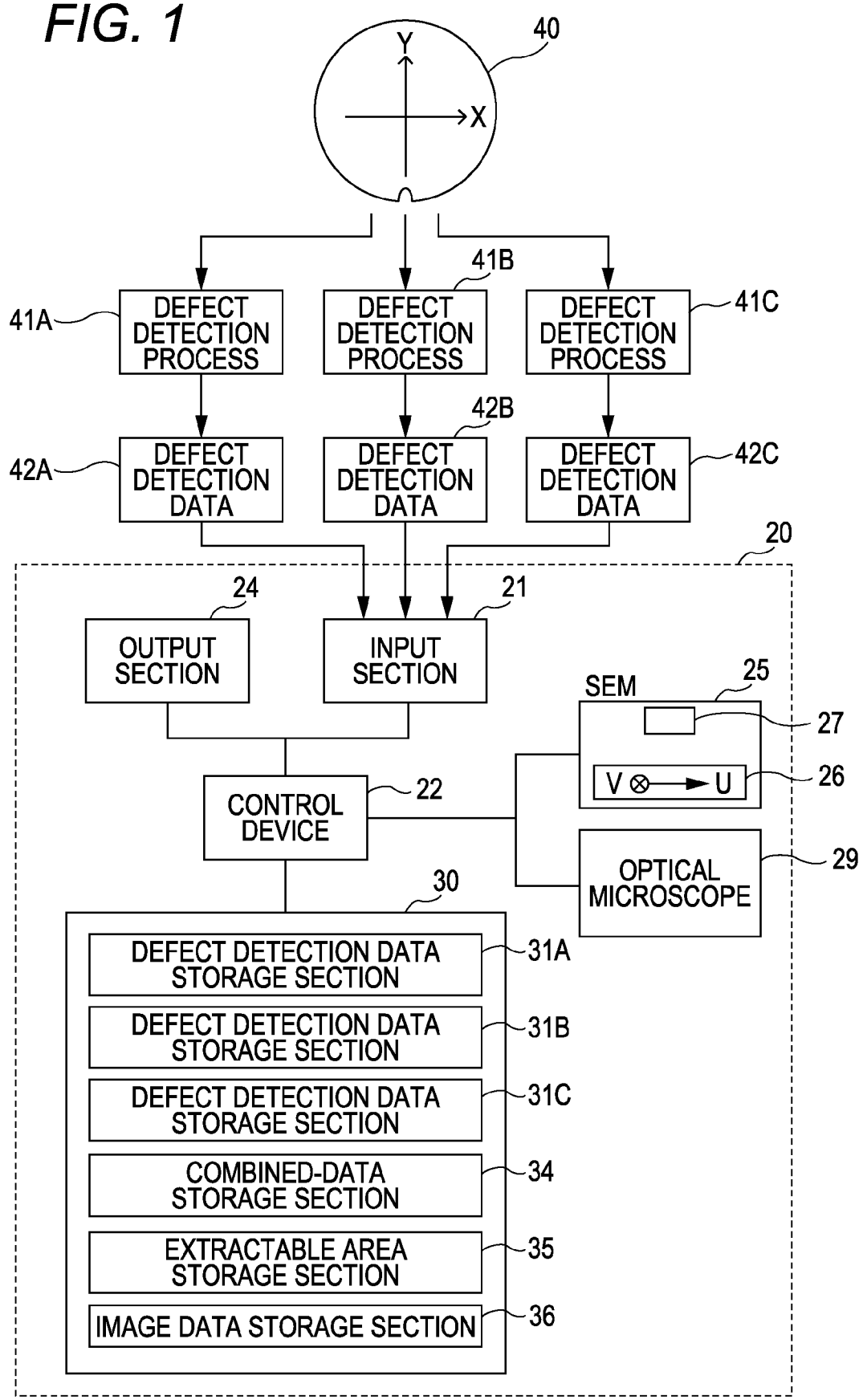
FIG. 1 is a block diagram of a defect review apparatus according to an embodiment.

FIG. 1 illustrates a block diagram of a defect review apparatus 20 according to an embodiment, and a wafer to be inspected. The defect review apparatus 20 includes an input section 21, a control device 22, an output section 24, a storage device 30, SEM 25, and an optical microscope 29. The input section 21 receives defect detection data 42A, 42B, and 42C. The defect detection data 42A is acquired by subjecting a semiconductor wafer 40 to be inspected (hereinafter referred to as inspection target wafer) to a defect detection process 41A under a given defect-detecting condition. Defects thus detected and the positions of these defects are registered in the defect detection data 42A. The position of each defect is expressed by, for example, an XY coordinate system (also called "a target-object coordinate system") defined on the surface of the inspection target wafer 40. The defect detection data 42B and 42C are acquired by subjecting the inspection target wafer 40 to defect detection processes 41B and 41C respectively.

The defect detection processes 41A to 41C adopt bright-field defect detection, laser scattering (dark-field) defect detection, and the like and methods and conditions for these detections differ from one another.

The bright-field defect detection will first briefly be explained. First, while an inspection target wafer is scanned, an image of a pattern on the wafer surface is picked up by an imaging device such as a camera. Images in areas where the same pattern is formed are compared and, if any difference is detected between them, the difference is recognized as a defect. Examples of a method for comparing images include a random mode (chip comparison mode) and an array mode (cell comparison mode).

In the random mode, the image of a chip currently in focus is compared with images of adjacent chips on both sides. If any difference is detected between the image of the chip currently in focus and those of the adjacent chips on either side, the difference is recognized as a defect in the chip currently in focus. In the array mode, where a number of cells of the same pattern exist in one chip as in a memory cell, the image of a cell currently in focus is compared with images of the adjacent cells on both sides. If any difference is detected between the former and the latter images, this difference is recognized as a defect of the cell currently in focus.

Next will briefly be described the dark-field defect detection. A laser is emitted onto an inspection target wafer from an oblique direction, and light scattering from this wafer is detected by a camera or the like. Image signals produced by light scattering from a normal pattern are ignored but image signals produced by light scattering from a foreign matter are extracted to detect the foreign matter.

For example, the dark-field defect detection may be adopted in the defect detection processes 41A to 41C. The incident angles of laser among these defect detection processes 41A to 41C are set so as to differ. Light-field defect detection may be used in the defect detection processes 41A to 41C. In this case also, the brightnesses and wavelengths, and the like of light sources among these defect detection processes 41A to 41C are set so as to differ. Alternatively, the defect detection processes 41A to 41C may adopt dark-field and light-field defect detections in combination.

The defect detection data 42A to 42C supplied to the input section 21 are stored in defect detection data storage sections 31A to 31C respectively in the storage device 30 through processes performed by the control device 22. Incidentally, there may additionally be four or more defect detection data storage sections. The control device 22 controls the SEM 25 and the optical microscope 29.

The SEM 25 includes a movable stage 26 and an electron beam source 27. The movable stage 26 moves in two dimensions while holding an inspection target wafer 40. An observing coordinate system (UV coordinate system) is defined for the movable stage 26. The SEM 25 transmits to the control device 22 an SEM image located in a position specified by coordinates in the observing coordinate system. The optical microscope 29 transmits to the control device 22 an optical image specified by the coordinates in the observing coordinate system.

The storage device 30 further includes a combined-data storage section 34, an extractable area storage section 35, and an image data storage section 36. The functions of these will be described below.

The output section 24 displays defect review results, SEM images, and optical images.

Figure 2:
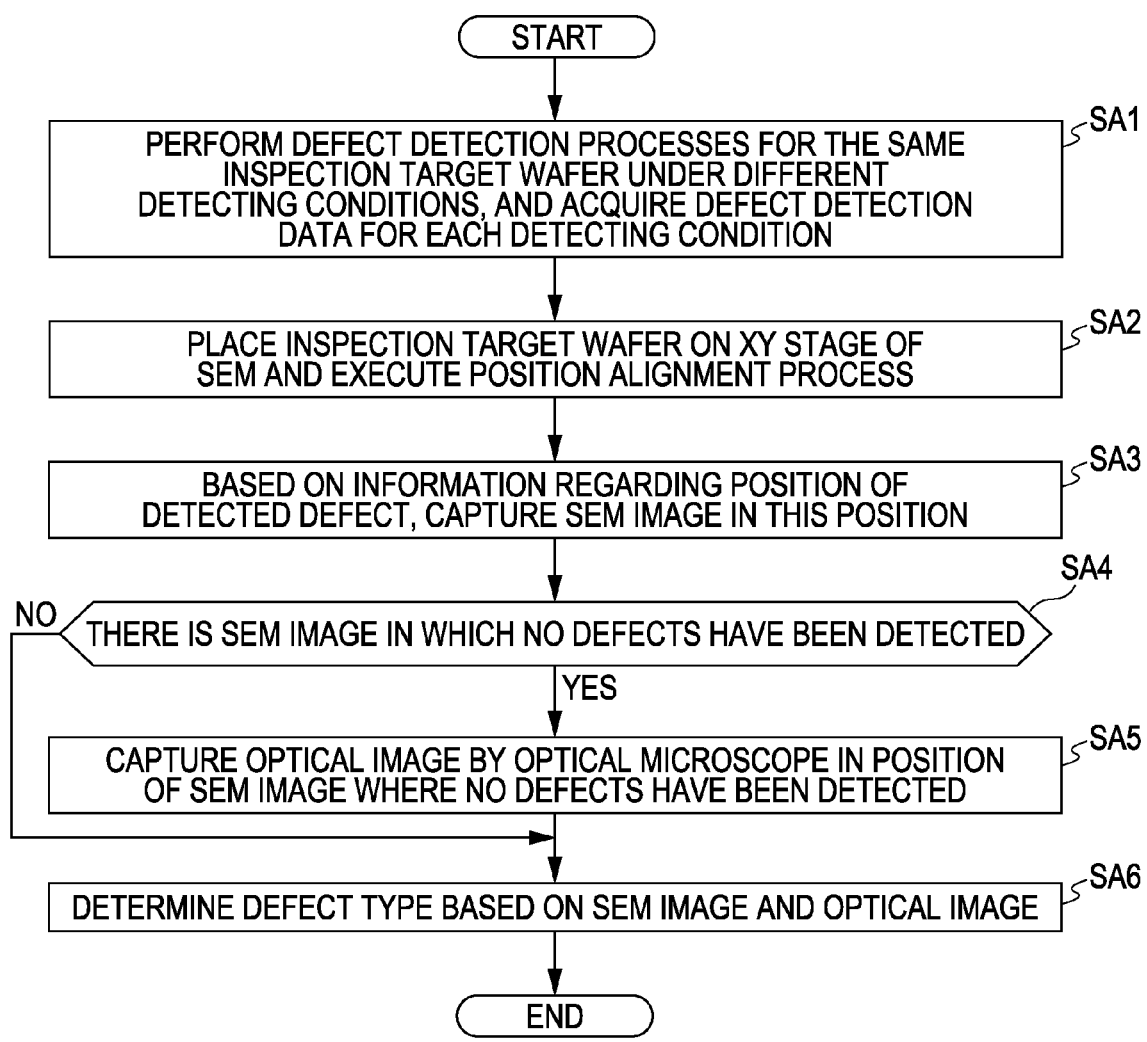
FIG. 2 is a flowchart for a defect review method according to the embodiment.

FIG. 2 illustrate a flowchart for a defect review method according to the embodiment. In step SA1, under different detecting conditions the defect detection processes 41A to 41C are performed for an inspection target wafer 40, and defect detection data 42A to 42C are acquired. Here, "the defect detection processes are performed under different detecting conditions" means not only that the defect detection processes are performed under different conditions using the same detecting device but also that the defect detection processes are performed using different detecting devices as in light-field defect detection and dark-field defect detection. In the embodiment, defect detection is conducted under three different conditions, thereby acquiring three sets of defect detection data, 42A to 42C. However, defect detection may be conducted under at least two different conditions, thereby acquiring at least two sets of defect detection data. Also, defect detection may be conducted under four or more different detection conditions, thereby acquiring four or more sets of defect detection data.

The defect detection data 42A to 42C acquired are input to the SEM review apparatus 20. The defect detection data 42A to 42C inputted are stored in the defect detection data storage sections 31A to 31C respectively.

In step SA2, the inspection target wafer 40 is placed on the movable stage 26 of the SEM 25. After being placed there, the inspection target wafer 40 is aligned with the target object coordinate system defined for the inspection target wafer 40. Specifically, the relative positional relation of the wafer 40 with the observing coordinate system defined on the movable stage 26 is measured.

Figure 3:
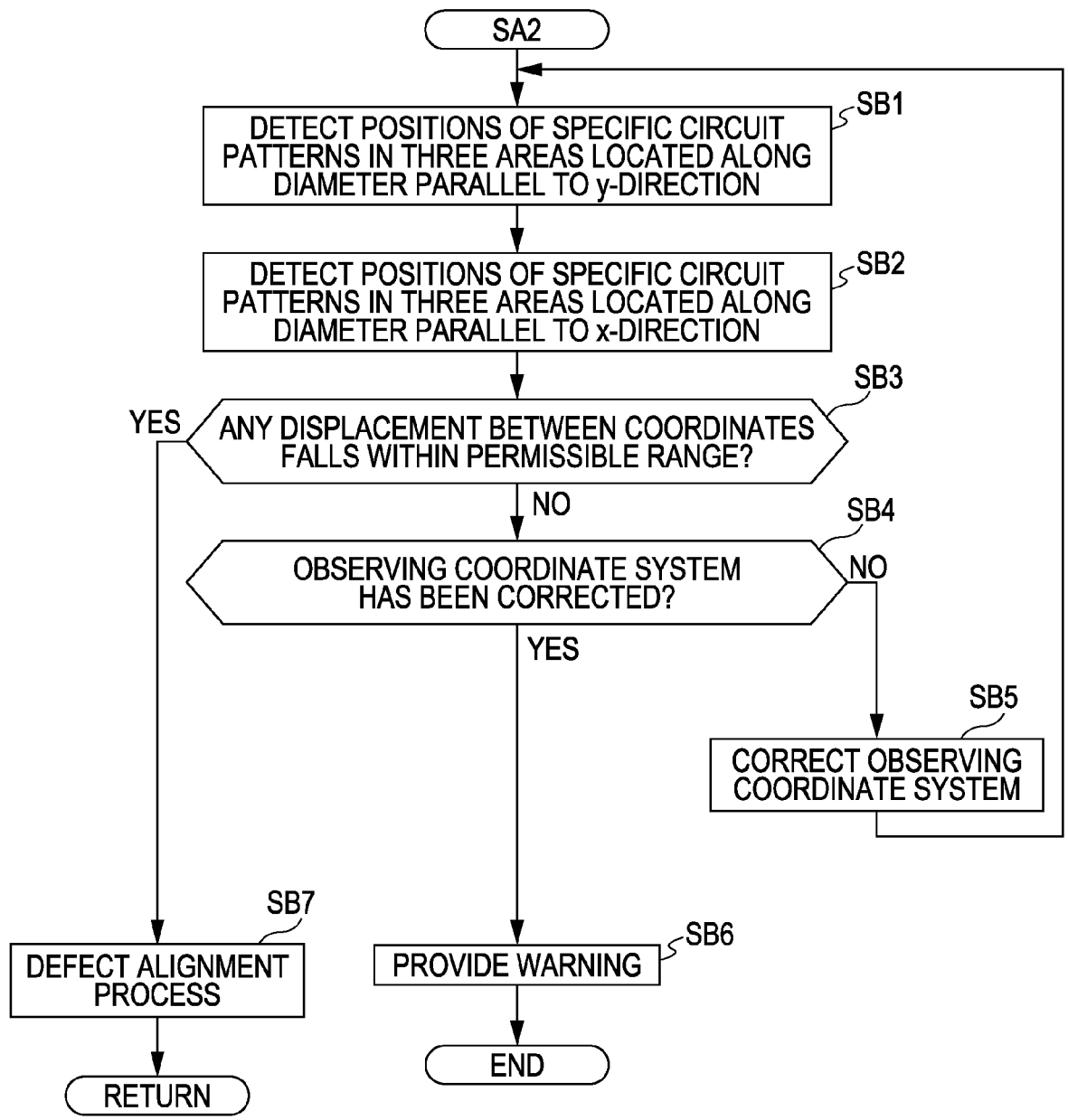
FIG. 3 is a detailed flowchart for step SA2 of the defect review method according to the embodiment.
Figure 5:
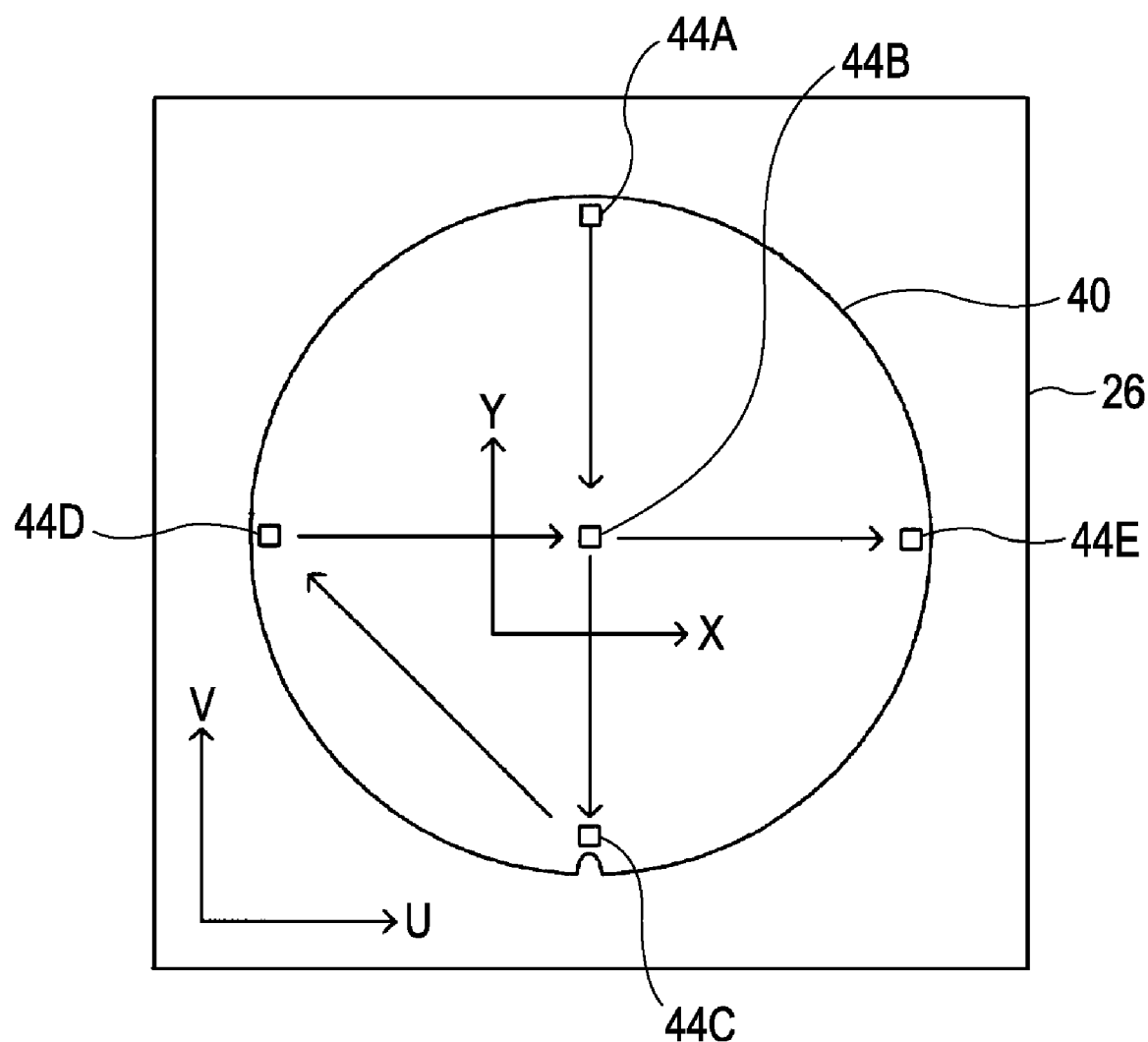
FIG. 5 is plan view illustrating a movable stage of the defect review apparatus according to the embodiment and an inspection target wafer placed on the movable stage.

FIG. 3 illustrate a flowchart for step SA2 in detail, and FIG. 5 is a plan view illustrating the movable stage 26 and inspection target wafer 40 held thereon. The inspection target wafer 40 is held on the moveable stage 26 so that the X-axis of the target object coordinate system and the U-axis of the observing coordinate system are substantially parallel to each other. On account of this, the Y-axis of the target object coordinate system and the V-axis of the observing coordinate system are also located substantially parallel to each other. To place the inspection target wafer 40 on the movable stage 26, the original positions of the target object coordinate system and observing coordinate system are co-aligned.

In step SB1, SEM images of specific patterns in three chips 44A, 44B, and 44C located along a diameter parallel to the Y-axis are acquired by the SEM 25 while the movable stage is moved in the direction of the V-axis. For example, the images of patterns corresponding to the respective corners of the chips 44A to 44C are acquired. The wafer coordinates of these specific patterns are already known. The chips 44A and 44C are selected from near each end of each diameter, and the chip 44B is selected from the middle of these diameters or from near the middle.

In step SB2, SEM images of specific patterns in three chips 44D, 44B, and 44E located along a diameter parallel to the X-axis are acquired by the SEM 25 while the movable stage is moved in the direction of the U-axis. The chips 44D and 44E are selected from near each end of the diameter. The chip 44B is identical to the one selected in the previous step, SB1.

In step SB3, the specific pattern images thus acquired are analyzed, and thereby the coordinates of the specific patterns in the five chips, 44A to 44E, are obtained in the observing coordinate system. Subsequently, a determination is made whether any displacement between the coordinates in the target object coordinate system acquired from the corresponding patterns and those in the observing coordinate system falls within a permissible range or not. The permissible range is set to, for example, 1 μm. If the displacement between coordinates falls within the permissible range, step SB7 is executed, and if the displacement exceeds the permissible range, step SB4 is executed.

In step SB4, a determination is made whether a correction process for the observing coordinate system has been carried out or not. If the determination is made that the correction process has not been carried out, a correction process for the observing coordinate system is performed in step SB5. After this correction process, the flow returns to step SB1 and the image acquiring process is performed using the corrected observing coordinate system. If it is determined in step SB4 that a correction process for the observing coordinate system has been carried out, the equipment such as the movable stage 26 may have been in an abnormal state. Accordingly, a warning is provided in step SB6 urging an operator to check for the abnormal state.

In step SB7 executed as a result of a determination made in step SB3 that the displacement between the coordinates falls within the permissible range, a defect alignment process is performed.

Figure 4:
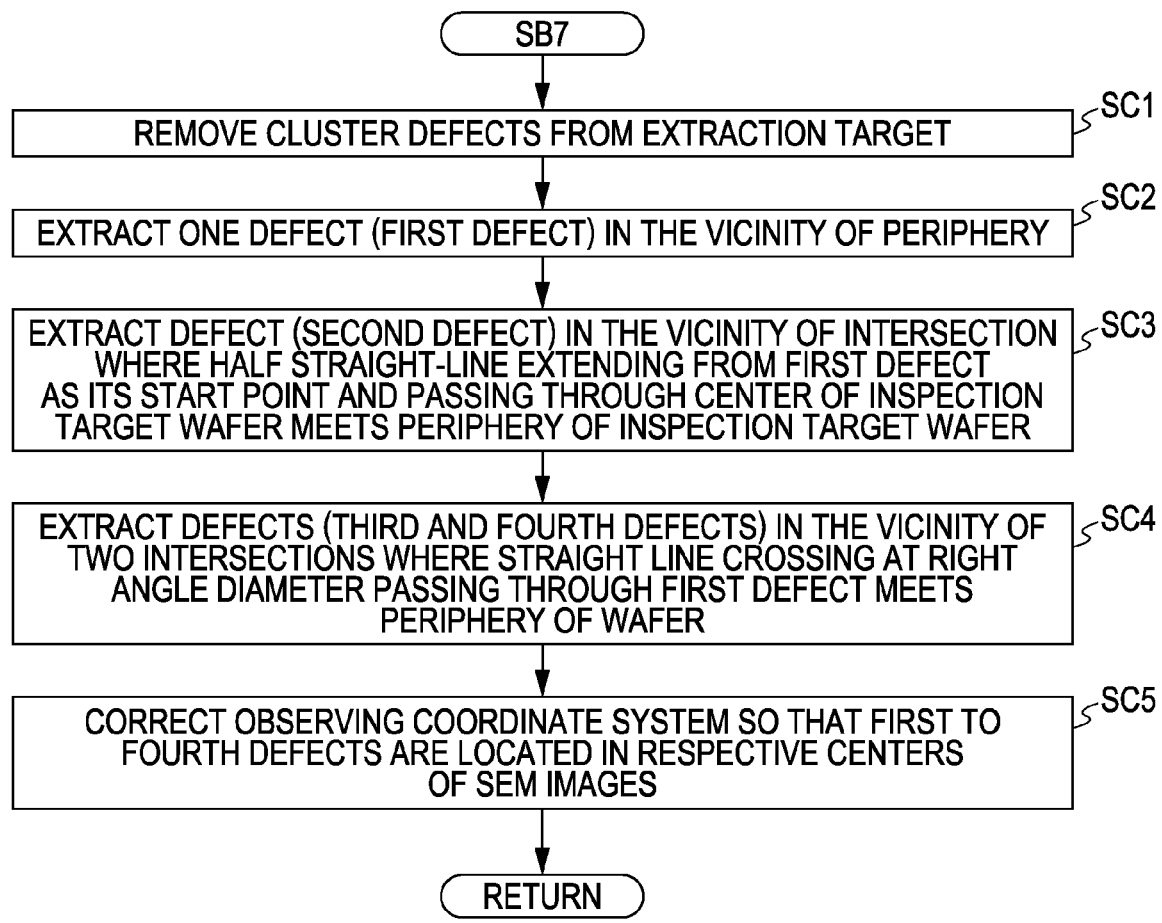
FIG. 4 is a detailed flowchart for step SB7 of the defect review method according to the embodiment.
Figure 6A:
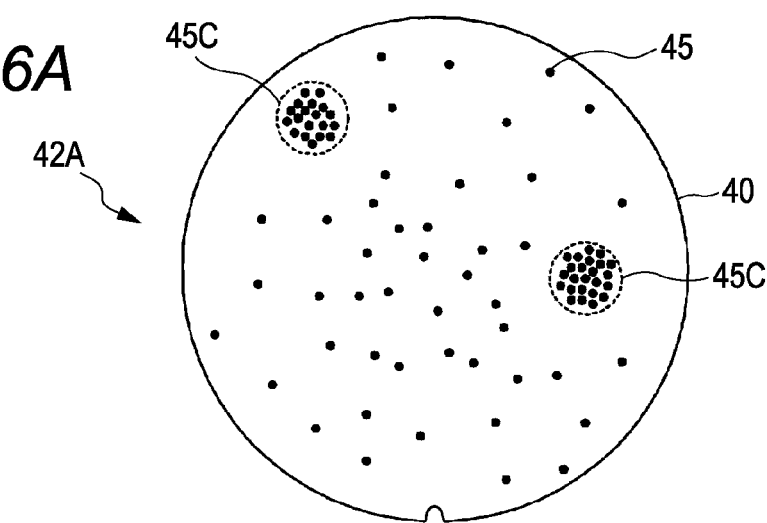
FIGS. 6A to 6E are plan views of inspection target wafers illustrating a defect extraction process performed for defect alignment.

FIG. 4 illustrates a flowchart for the defect alignment process. FIG. 6A illustrates the distribution of a defect 45 registered in, for example, defect detection data 42A. There may be a case where defects are close together locally. Such defects 45C which are close together locally are called "a cluster defect." A cluster defect is determined as follows: if the number of defects, for example, within a very small area exceeds a given upper limit, the defects within the very small area are recognized as a cluster defect.

Figure 6B:
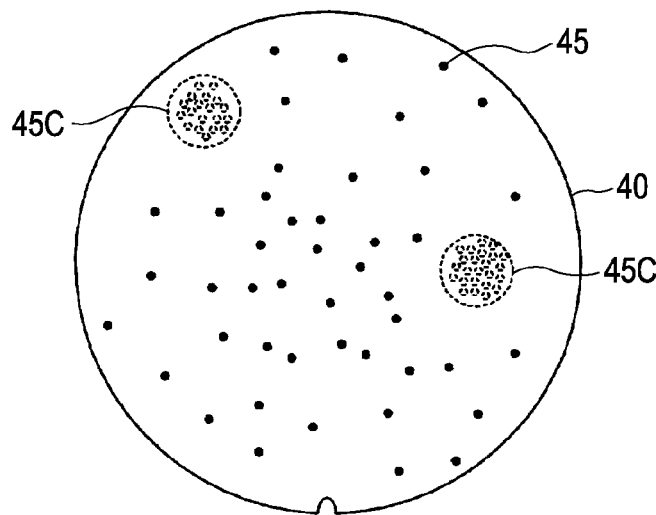

In step SC1, cluster defects 45C are removed from an extraction target. In FIG. 6B, cluster defects 45C removed from the extraction target are indicated with white circles.

Figure 6C:
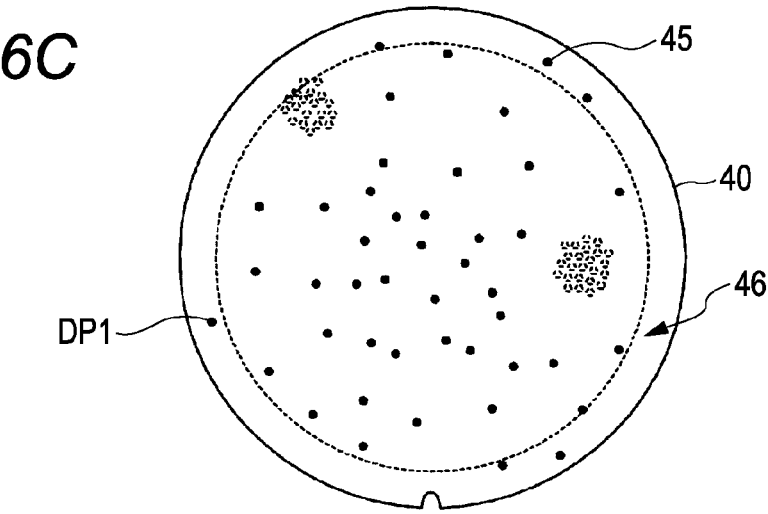

In step SC2, as illustrated in FIG. 6C, one defect in the vicinity of the periphery of the inspection target wafer 40 is extracted from the defects 45 from which the cluster defects 45C are removed, and this defect is labeled as a first defect DP1. Here, "the vicinity of the periphery" is defined as an annular area 46 that has the periphery of the inspection target wafer 40 as its outer edge. The width of the annular area 46 is stored in the extractable area storage section 35 illustrated in FIG. 1. The width is, for example, 5 μm.

As a first defect DP1, any one defect 45 may be extracted from the annular area 46. It may be a defect 45 closest to the periphery. If no defects are found within the annular area 46, the presence or absence of a defect is determined while the annular area 46 is broadened 1 μm at a time. If there are defects within the broadened annular area, any one defect is extracted from among them as a first defect DP1. If no defects have been detected within the annular area 46, the outermost defect among defects 45 located in an area further inside than this annular area may be extracted as the first defect DP1.

Figure 6D:
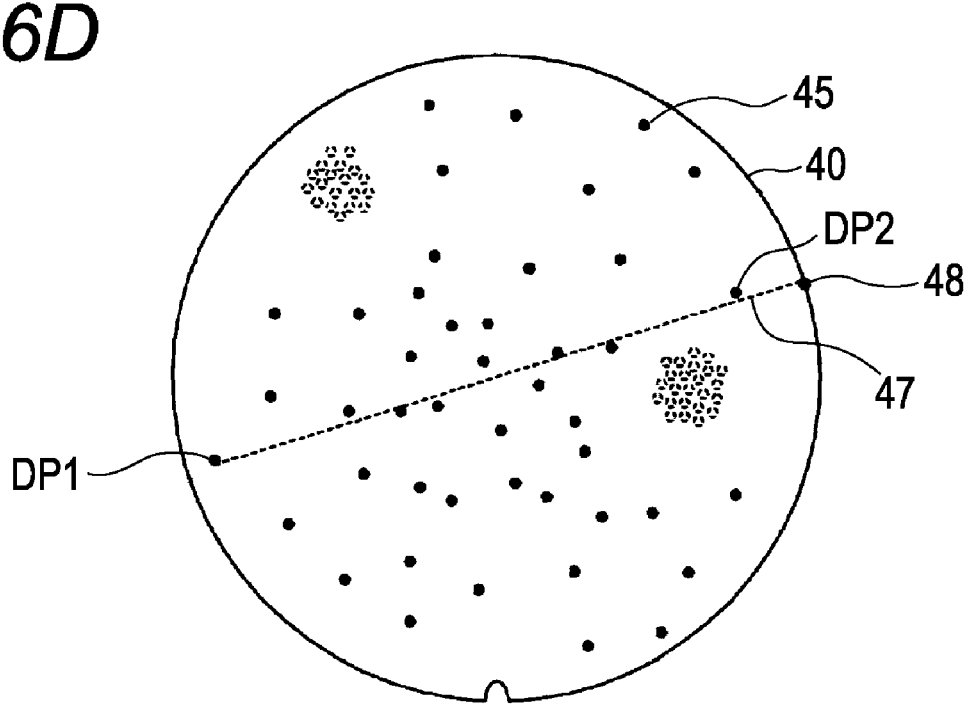

In step SC3, as illustrated in FIG. 6D, a defect 45 located closest to the intersection 48 where a first straight line 47 extending from the first defect DP1 as its start point and passing through the center of the inspection target wafer 40 meets the periphery of the inspection target wafer 40 is extracted as a second defect DP2. Alternatively, any one of the defects whose distance from the intersection 48 is equal to or shorter than the distance stored in the extractable area storage section 35 may be extracted.

Figure 6E:
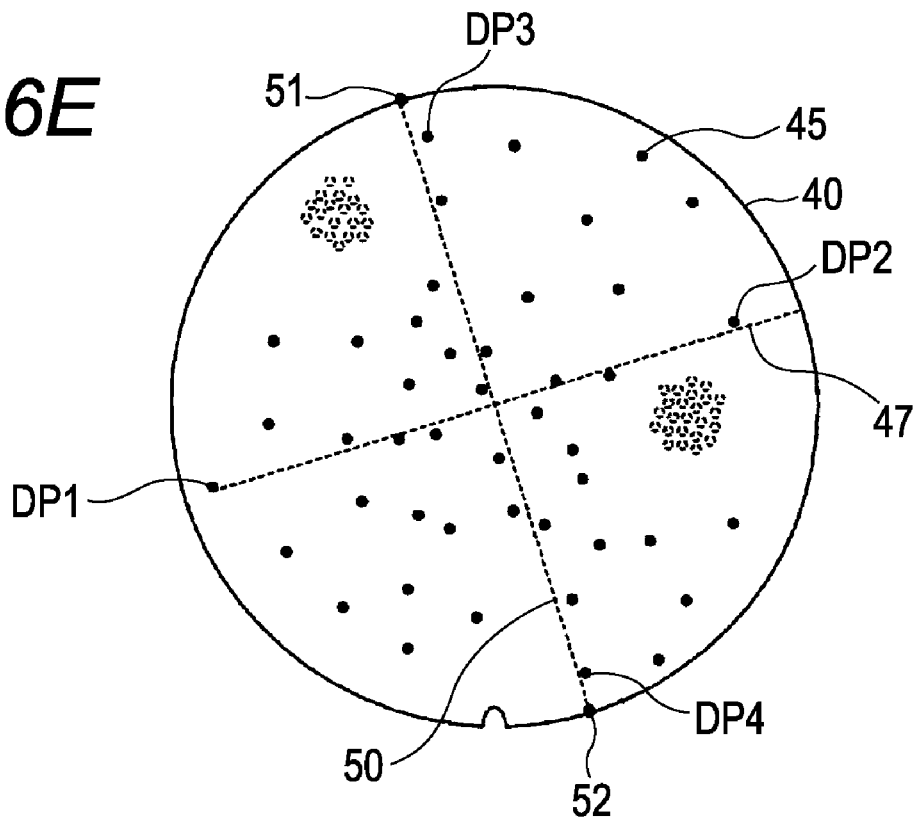

In step SC4, as illustrated in FIG. 6E, defects located closest to the intersections 51 and 52 where a straight line 50 crossing the first straight line 47 at a right angle and passing through the center of the inspection target wafer 40 meets the periphery of the inspection target wafer 40 are extracted as a third defect DP3 and a fourth defect DP4 respectively. Alternatively, any one of the defects whose distance from the corresponding intersections, 51 and 52, are equal to or shorter than the distance stored in the extractable area storage section 35 may be extracted.

Instead of the straight line 50, a straight line that intersects, at a right angle, a diameter passing through the second defect DP2, and passes through the center of the inspection target wafer 40, may be used. Also, instead of the straight line 50, a straight line that intersects at a right angle a straight line passing through the first and second defects DP1 and DP2 may be used.

In the foregoing method, the first to fourth defects DP1 to DP4 are extracted from among the defects registered in the defect detection data 42A. However, they may be extracted from among defects registered in another defect detection data. Alternatively, they may be extracted from among defects registered in any of a plurality of detection data.

In step SC5, SEM images of the first to fourth defects DP1 to DP4 are acquired. The observing coordinate system is corrected so that these defects are located in the respective centers of the SEM images.

If there is a false defect among the extracted first to fourth defects DP1 to DP4 and no defect is detected in the SEM image, another defect may be extracted from among defects in the vicinity of this false defect.

An actual defect is observed to correct the observing coordinate system, so that SEM images in which the defects are located almost in the center may be obtained for the defects other than the first defect DP1 to the fourth defects. In addition, the first to fourth defects DP1 to DP4 may be distributed near the periphery of the inspection target wafer 40 and at substantially regular intervals along the circumference. This improves accuracy in correcting the observing coordinate system.

If the first to fourth defects DP1 to DP4 are detected from among the cluster defects 45C, defects adjacent to the defects actually extracted are likely to be erroneously recognized as extracted ones. Such misrecognition may be prevented by removing the cluster defects 45C before defect extraction.

After the defect alignment process is finished, step SA3 illustrated in FIG. 2 is executed. In step SA3, the SEM images of defects are acquired based on information regarding the position of detected defects. The procedure for step SA3 will now be described in detail.

FIGS. 7A to 7C illustrate examples of defect detection data 42A to 42C respectively. An identifier for a detected defect and information regarding its position are registered in each of the defect detection data 42A to 42C. For example, the positions of the defects DA1, DB1, and DC1 of the defect detection data 42A, 42B, and 42C are all defined by (x1, y1). Therefore, these defects are recognized as the same defect. Thus, based on information regarding the position of the detected defects, the determination of identity of the defects is made. Conditions for determining identity of defects need not require that the positions of the defects be exactly the same. Even if the detected positions of the defects differ slightly, when the difference falls within the range of detection error or is substantially equal to the dimensions of the defect, a determination is made that these defects are the same.

If one defect is registered in at least in two of the defect detection data 42A to 42C, this defect is called "a duplicate defect." Combined-data 42M is created by combining the defect detection data 42A to 42C so that the duplicate defect is registered as a single defect. The combined-data 42M is stored in the combined-data storage section 34.

FIG. 7D illustrates examples of the combined-data 42M. The defects DA1, DB1, and DC1 of defect detection data 42A, 42B, and 42C respectively are registered as one defect.

Figure 8A:
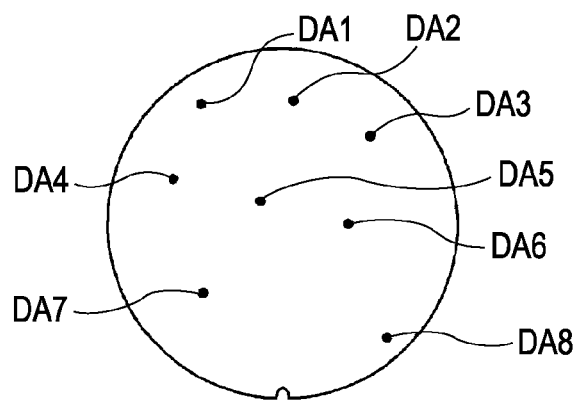
FIGS. 8A to 8C are plan views of inspection target wafers illustrating examples of the distributions of defects registered in the defect detection data.
Figure 8B:
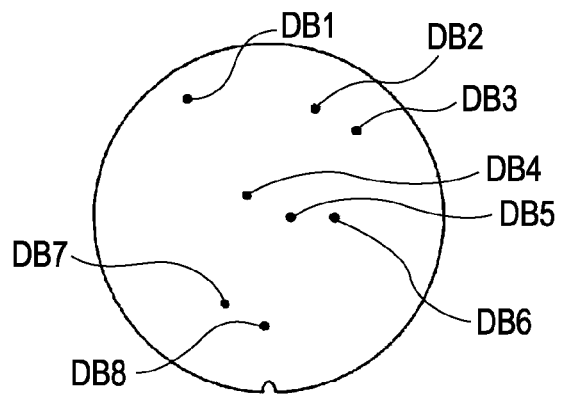
Figure 8C:
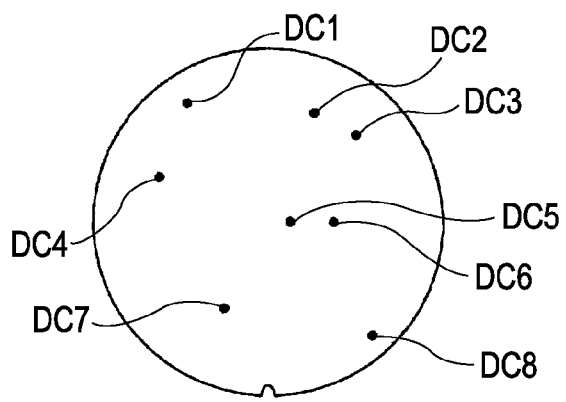
Figure 8D:
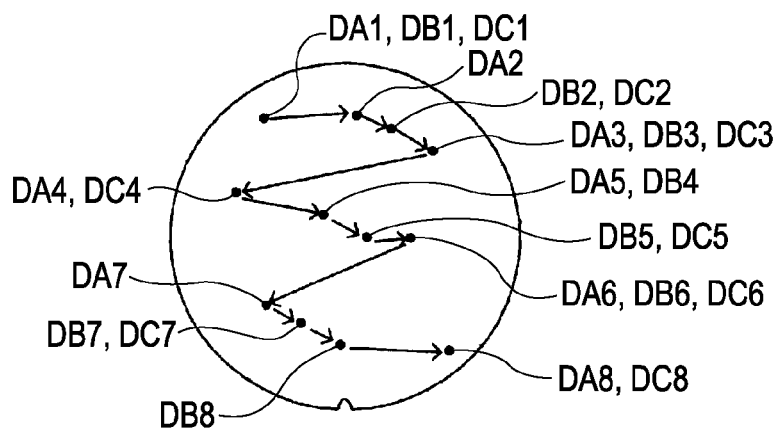
FIG. 8D is a plan view of an inspection target wafer illustrating an example of defects registered in combined-data.

FIGS. 8A to 8C illustrate examples of the respective distributions of defects registered in the corresponding defect detection data 42A to 42C. FIG. 8D illustrates an example of the distribution of the defect registered in the combined-data 42.

The control device 22 sequentially captures SEM images in positions specified by defect information regarding position registered in the combined-data 42M. The captured SEM images are stored in the image storage section 36 illustrated in FIG. 1. FIG. 8D illustrates an example of the defect order of capturing of the SEM images, indicated by arrows.

In step SA4, a determination is made if any of the captured SEM images shows no defects. If there is an SEM image in which no defects have been detected, an optical image in the position where no defects have been detected is captured in step SA5, and then step SA6 is executed. If defects have been detected in all the SEM images, step SA5 is skipped and step SA6 is executed. The optical image captured in step SA5 is stored in the image data storage section 36 illustrated in FIG. 1.

Also, in optical image capturing as in the SEM image capturing, control is exerted so as not to capture duplicate optical images of the duplicate defect.

In step SA6, the type of defect detected is determined based on the SEM image and the optical image. For instance, if no defects are found in an SEM image while a defect is found in an optical image, the defect is determined as one formed in a lower layer. If a defect is found in an SEM image, the defect is determined as a defect in an upper layer. If no defect is found in either an SEM image or an optical image, a determination is made that this defect is not an actual defect resulting from the process but is a false defect resulting from the defect detection process.

Further, according to the geometrical shape, size, pattern and the like of an SEM image or an optical image, the type of defect may be categorized as a lower layer pattern failure, a lower layer foreign matter, an inter-layer insulation film scratch, an upper layer foreign matter, embedded tungsten residue, and the like.

FIGS. 9A to 9C illustrate the contents of the defect detection data storage sections 31A to 31C. A defect type, a pointer indicating the place where an SEM image is stored, and a pointer indicating the place where an optical image is stored, are associated and stored for each of defects registered in the defect detection data 42A to 42C.

A defect type, an SEM image, or an optical image is output to the output section 24 at the request of an operator. Optimal conditions for the defect detection process may be estimated from a number of defect detection data in which the defect types are registered. For example, optimal conditions for the defect detection have fewer false defects and fewer detection failures of defects in an upper layer.

Figure 10A:
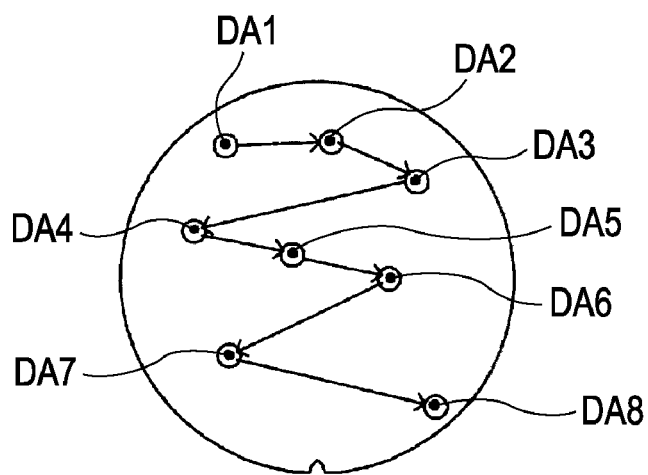
FIG. 10A to 10C are plan views of inspection target wafers for illustrating the order of capture of SEM images in a modification of the embodiment.
Figure 10B:
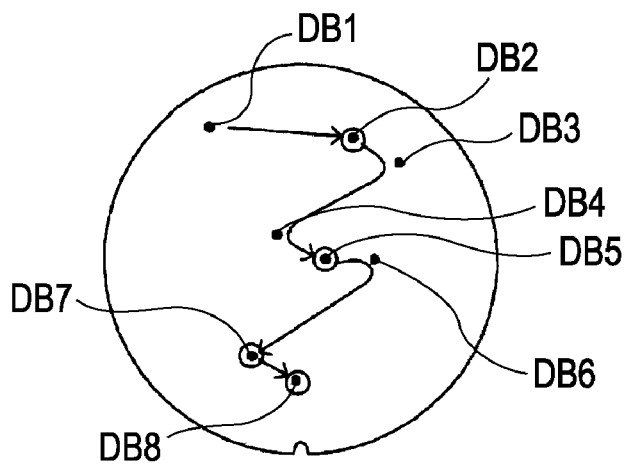
Figure 10C:
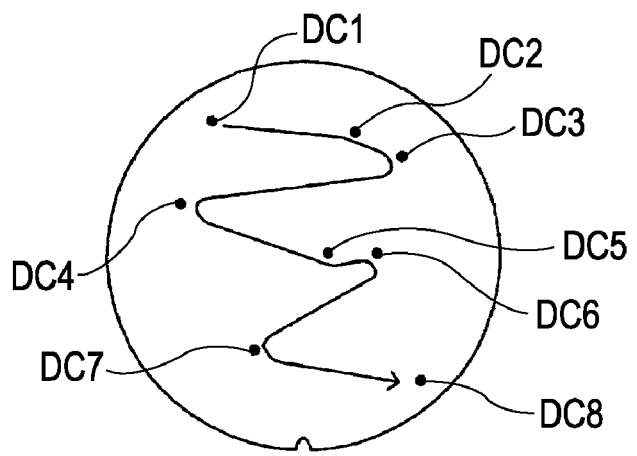

Referring to FIGS. 10A to 10C, next will be described a modification of the embodiment described above. In this example, specifically, the procedure for step SA3 illustrated in FIG. 2 differs from that in the embodiment described above.

FIG. 10A to 10C illustrate examples of the respective distributions of defects registered in the corresponding defect detection data 42A to 42C. As illustrated in FIG. 10A, SEM images in the positions of defects registered in the defect detection data 42A are acquired sequentially. Defects in white circles in FIG. 10A indicate that SEM images of them are captured.

As illustrated in FIG. 10B, SEM images in the positions of defects registered in the subsequent image detection data 42B, are captured sequentially. At this time, a determination is made whether a defect of which an SEM image is to be captured is a duplicate or not. If the defect of which an SEM image is to be captured is a duplicate, an SEM image of the defect is not captured. An SEM image of a defect that is identical to one that has been captured in the process illustrated in FIG. 10A is assigned to the defect registered in the defect detection data 42B. If the defect of which an SEM image is to be captured is not a duplicate, an SEM image in the position of the defect is captured.

As illustrated in FIG. 10C, SEM images in the positions of defects registered in the next defect detection data, 42C, are captured sequentially. In this case also, a determination is made whether each defect of which an SEM image is to be captured is a duplicate or not. SEM images are captured only where these are non-duplicates. FIG. 10C illustrates the case where defects DC1 to DC 8 are all duplicate images. No SEM images of the defects DC1 to DC8 registered in the defect detection data 42C are captured.

The embodiment described above and the modification avoid capturing a duplicate SEM image corresponding to a defect determined as a duplicate. Thus, the time required for defect review can be shortened. In addition, avoiding repeated emission of electron beams onto the same place reduces the damage on inspection target wafers.

In the embodiment described above, an example of a defect review for a semiconductor wafer is used. However, defect review may also be performed for other inspection target objects such as a TFT substrate used in a liquid crystal display apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that various changes, substitutions, and alterations could be made hereto without departing from the spirit and scope of the invention.

What is claimed is:

1. A defect review apparatus comprising:
a storage device which stores data about a defect of an inspection target object;
a first imaging device which captures an image located in a position on a surface of the inspection target object, the position being specified by information regarding the position of the inspection target object which has been input; and
a control device which controls the first imaging device;
wherein the storage device stores: first defect detection data including a defect number labeling the defect of the inspection target object detected by a first defect detection process, and information regarding the position of the defect; and second defect data including a defect number labeling the defect of the inspection target object detected by a second defect detection process, and information regarding its position; and
based on the first defect detection data and the second defect detection data, the control device determines whether or not a same defect is registered in both the first defect detection data and second defect detection data, and if the same defect is registered in both the first defect detection data and the second defect detection data, the control device registers this defect in the storage section as a duplicate defect; and when capturing an image of the defect by the first imaging device, the control device directs capture of an image of the duplicate defect based on the information regarding the position registered in the first defect detection data, and then the control device does not direct capture of an image of the duplicate defect based on the information regarding the position registered in the second defect detection data.

2. The defect review apparatus of claim 1, wherein the control device contains one combined-data of duplicate defects comprised of the first defect detection data and the second defect detection data.

3. The defect review apparatus of claim 1, wherein after capturing, with the first imaging device, an image located in a position specified by the information regarding the position of the defect included in the first defect detection data and then, when capturing an image located in the position specified by the information regarding the position of the defect included in the second defect detection data, the control device determines whether the defect is a duplicate defect or not, and if the defect is the duplicate defect, the control device does not capture an image located in the position specified by the information regarding the position of the duplicate defect.

4. The defect review apparatus of claim 1, wherein the first imaging device is a scanning electron microscope, and the apparatus further comprises an optical microscope as a second imaging device.

5. The defect review apparatus of claim 1, wherein the first imaging device has an observing coordinate system and captures an image located in an position specified by the observing coordinate system, the inspection target object has a target object coordinate system, the control device directs capture of an image of a pattern formed on the inspection target object, and obtains a relative positional relation between the target object coordinate system and the observing coordinate system from coordinates for the pattern in the target object coordinate system and coordinates for the pattern in the observing coordinate system, which has been acquired from the captured image of the pattern formed on the inspection target object, and the control device extracts one of the defects registered in the first defect detection data or second defect detection data, directs capture of an image of the defect thus extracted, and corrects the relative positional relation based on the position of the defect in the captured image.

6. The defective review apparatus of claim 5, wherein when correcting the relative positional relation, the control device removes a cluster defect and extracts the one defect from among defects remaining after the removal of the cluster defect.

7. The defect review apparatus of claim 5, wherein the storage device includes a width storage section which stores the width of a defect distribution area of the inspection target object, and when correcting a relative positional relation, the control device extracts one defect from an annular area stored in the width storage section or extracts, if no defects are found in the annular area, a defect closest to the periphery of the inspection target object.

8. The defect review apparatus of claim 5, wherein when correcting the relative positional relation, the control apparatus extracts one defect as a first defect, and thereafter, finds a first straight-line extending from the extracted first defect as a start point and passing through the center of the inspection target object, and extracts as a second defect a defect closest to the intersection where the straight line meets the periphery of the inspection target object.

9. The defect review apparatus of claim 8, wherein when correcting the relative positional relation, the control device finds a second straight line crossing the first straight-line at a right angle and passing through the center of the inspection target object, and thereafter finds two intersections where the second straight line meets the periphery of the inspection target object, and extracts, as a third defect and a fourth defect, defects closest to the two intersections.

10. A defect review method comprising:
a first registration step that detects a defect of an inspection target object under a first detecting condition, and registers, in a storage device, first defect detection data which are a defect number labeling the detected defect, and information regarding the position of the defect;
a second registration step that detects a defect of an inspection target object under a second detecting condition, and registers, in the storage device, second defect data which are a defect number labeling the detected defect, and information regarding its position;
a third registration step that determines whether or not a same defect is registered in both the first defect detection data and the second defect detection data, and if the defect is registered in both the first defect detection data and the second defect detection data, this defect in the storage device as a duplicate defect;
a first image capturing step that captures an image of the defect included in the first defect detection data; and
a second image capturing step that captures an image of the defect included in the second defect detection data, except the duplicate defect.

11. The defect review method of claim 10, wherein the third registration step creates, after capturing the first defect detection data and the second defect detection data, one combined-data comprising the duplicate defect by combining the first and second defect detection data.

12. The defect review apparatus of claim 10, wherein the first image capturing step captures an image located in a position specified by information regarding the position of the defect included in the first defect detection data, and the second image capturing step determines whether the defect is a duplicate defect or not before capturing an image located in the position specified by information regarding the position of the defect included in the second defect detection data and, if the defect is the duplicate defect, avoids capturing an image located in the position specified by the information regarding the position of the duplicate defect.

13. The defect review method of claim 10, wherein the first and second image capturing steps capture the images by means of a scanning electron microscope, and the first and second image capturing steps further include: capturing, if no defects are found in the positions of the images captured by the scanning electron microscope, images in these positions by means an optical microscope; and determining a defect type based on the images captured by the scanning electron microscope and the images captured by the optical microscope.

14. The defect review method of claim 10, wherein the first and second image capturing steps further include: capturing an image of a pattern formed on the inspection target object by specifying a position in an observing coordinate system, and obtaining a relative positional relation between the target object coordinate system and the observing coordinate system from coordinates for the pattern in the target object coordinate system and coordinates for the pattern in the observing coordinate system; and extracting one of defects on the target inspection object, capturing an image of the extracted defect, and correcting the relative positional relation based on the position of the defect in the captured image.

15. The defective review method of claim 14, wherein when the relative positional relation is corrected, a cluster defect is removed and one defect is extracted from among defects remaining after the removal of the cluster defect.

16. The defect review method of claim 14, wherein when the relative positional relation is corrected, one defect is extracted from among defects whose distance to the periphery of the inspection target object is equal to or shorter than a first distance and, if there is no defect whose distance to the periphery is equal to or shorter than the first distance, a defect closest to an outer edge which is the periphery of the inspection target object is extracted.

17. The defect review method of claim 14, wherein when the relative positional relation is corrected, one defect is extracted and registered in the storage device as a first defect, and thereafter, a first straight-line extending from the extracted first defect as a start point and passing through the center of the inspection target object is found, and a defect closest to the intersection where the first straight-line meets the periphery of the inspection target object is extracted and registered in the storage section as the second defect.

18. The defect review method of claim 17, wherein when the relative positional relation is corrected, a second straight line crossing the first straight line at a right angle and passing through the center of the inspection target object is found, and thereafter two intersections where the second straight line meets the periphery of the inspection target object are found, and defects closest to the two intersections are extracted as a third defect and a fourth defect.

* * * * *